United States Patent [19]

Kunugi et al.

[11] Patent Number: 4,563,882
[45] Date of Patent: Jan. 14, 1986

[54] AIR COOLING TYPE ABSORPTION COOLER

[75] Inventors: Yoshifumi Kunugi; Shigeo Sugimoto, both of Ibaraki; Kisaburo Minakawa, Tsuchiura; Kenzi Machizawa, Ibaraki, all of Japan

[73] Assignee: Hitachi, Ltd., Tokyo, Japan

[21] Appl. No.: 746,666

[22] Filed: Jun. 20, 1985

[30] Foreign Application Priority Data

Jun. 20, 1984 [JP] Japan .................. 59-125107
Sep. 28, 1984 [JP] Japan .................. 59-201606

[51] Int. Cl.⁴ .................................. F25B 15/00
[52] U.S. Cl. ........................... 62/476; 62/485
[58] Field of Search ..................... 62/476, 485

[56] References Cited

U.S. PATENT DOCUMENTS

| 2,387,657 | 10/1945 | Gross | 62/485 X |
| 3,491,545 | 1/1970 | Leonard, Jr. | 62/476 X |
| 3,605,873 | 9/1971 | Leonard, Jr. | 62/476 |
| 3,717,007 | 2/1973 | Kuhlenschmidt | 62/476 X |
| 4,028,904 | 6/1977 | Anderson | 62/485 X |
| 4,078,399 | 3/1978 | Sugimoto et al. | 62/476 |

Primary Examiner—Lloyd L. King
Attorney, Agent, or Firm—Antonelli, Terry & Wands

[57] ABSTRACT

An air cooling type absorbing cooler provided with an air cooling type absorber having a structure in which, in cooling the absorbing solution and the refrigerant vapor by air, the absorbing solution and the refrigerant vapor on the inlet side of the absorber are cooled by the cooling air on the outlet side of the absorber, while the absorbing solution on the outlet side of the absorber is cooled by the cooling air on the outlet side. By causing the absorbing solution sprayed into the absorber to flow downward and the air for cooling the absorbing solution and the refrigerant vapor to flow upward, the absorbing solution having a temperature which is approximately equal to the outlet temperature of the absorber is cooled by the air which has a temperature approximately equal to the inlet temperature of the cooling air. The absorbing solution supplied from the absorber is cooled by the refrigerant vapor evaporated by the evaporator.

14 Claims, 9 Drawing Figures

AIR COOLING TYPE ABSORPTION COOLER

BACKGROUND OF THE INVENTION

This invention relates to an air cooling type absorption cooler.

An absorption refrigerating machine which uses water as a refrigerant and lithium bromide as an absorbent is disclosed in U.S. Pat. No. 4,078,399. In this prior art, water is used for cooling an absorber and a condenser. Water is utilized for cooling in order to realize an operating temperature of about 40° C. for the absorber and the condenser.

However, no absorption refrigerating machine which uses water as a refrigerant and lithium bromide as an absorbent and which utilizes air for cooling the absorber and the condenser, (namely, an air cooling type refrigerator) has yet been disclosed.

It is known to utilize air for cooling the absorber and the condenser in an absorption refrigerating system, as is disclosed in U.S. Pat. No. 3,605,873. In this case, however, it is inconveniently necessary to use a florocarbon system which enables the operating temperature and the pressure of the absorber and the condenser to be heightened.

SUMMARY OF THE INVENTION

It is an object of the invention to provide an air cooling type absorption cooler which uses water as a refrigerant and lithium bromide as an absorbent and in which the absorber and the condenser are of the air cooling type.

This invention is characterized in that the absorbing solution to be sprayed within the absorber is caused to flow downward, air for cooling the absorbing solution and refrigerant vapor is caused to flow upward, and the absorbing solution in the range where the temperature of the absorbing solution is approximate to the outlet temperature of the absorber is cooled by the air in the region where the temperature of the air is approximately equal to the temperature of the cooling air as it enters. If the absorbing solution supplied from the absorber is cooled by the refrigerant vapor evaporated by an evaporator, a better effect is obtained.

DESCRIPTION OF THE PREFERRED EMBODIMENTS

Embodiment 1

Figure 1:
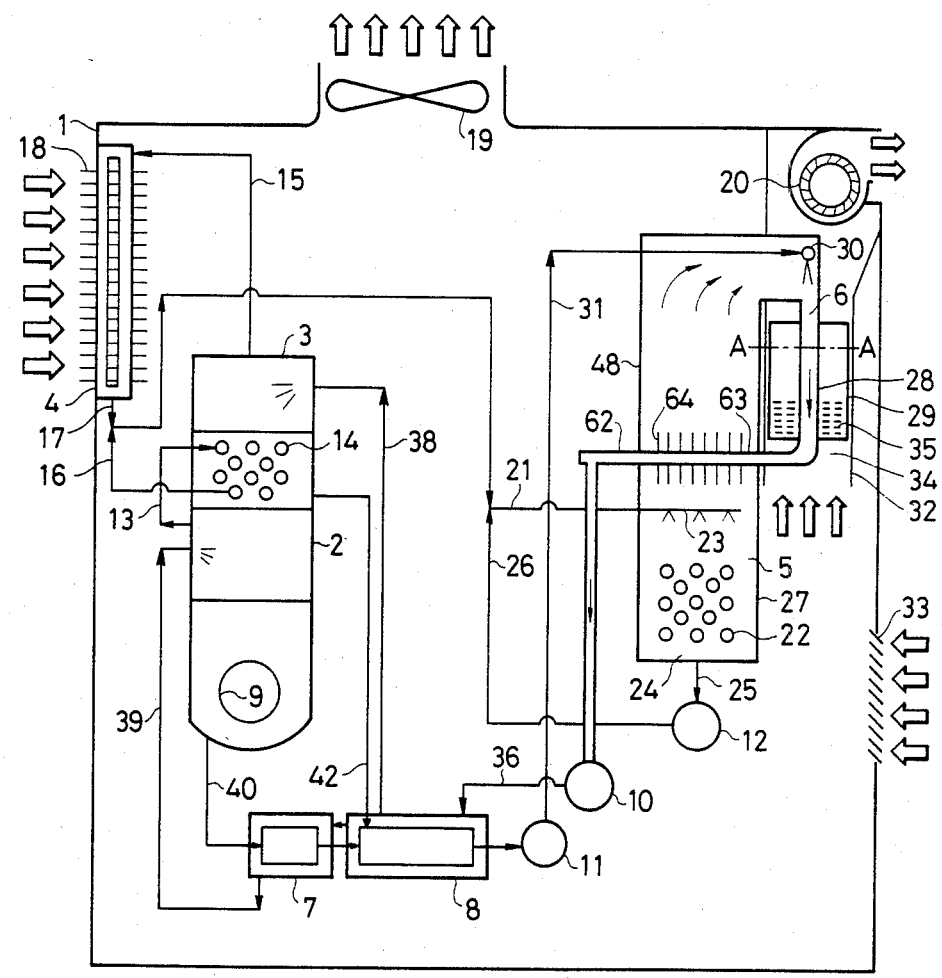
FIG. 1 is a flow diagram of an embodiment of an air cooling type absorption cooler according to the invention.

Referring to FIG. 1, an air cooling type absorption cooler 1 uses water as a refrigerant and lithium bromide as an absorbent. The air cooling type absorption cooler 1 includes a first generator 2, a second generator 3, an air cooling type condenser 4, an evaporator 5, an air cooling type absorber 6, a first heat exchanger 7, a second heat exchanger 8, a heating source 9 such as a burner or superheated vapor, a dilute solution pump 10, a dense solution pump 11, and a refrigerant pump 12. It is possible to dispense with the dense solution pump 11.

The first generator 2 has a heating source 9, and the absorbing solution composed by mixing water with lithium bromide is poured into it. The first generator 2 heats the absorbing solution with the aid of the heating source 9 so as to generate refrigerant vapor.

The second generator 3 which has a heating pipe 14 connected to the first generator 2 through a conduit 13 generates refrigerant vapor by heating the absorbing solution with the refrigerant vapor which has been generated by the first generator 2 with the absorbing solution poured within it.

The condenser 4 is connected to the second generator 3 through a conduit 15 and cools and condenses the refrigerant vapor flowing from the second generator 3 by the air passing around the condenser 4.

The evaporator 5 having a cold water pipe 22 evaporates the liquid refrigerant from the condenser 4 by spraying it from a spray header 23, and cools the water in the cold water pipe 22 by virtue of the latent heat generated at the time of the evaporation, thereby producing cold water.

The absorber 6 has a plurality of vertically extending absorbing pipes 28 connected to the upper portion of the evaporator 5 and fins 29 respectively mounted to each absorbing pipe 28. The absorber 6 makes the absorbing solution sprayed from above each absorbing pipe 28 absorb the refrigerant vapor flowing from the evaporator 5, whereby the absorbing solution is caused to contain a large amount of refrigerant. A duct 32 is disposed around the absorbing pipes 28 such that cooling air flows from the lower port of the duct 32, flows upwardly, and is exhausted from the upper port. The flow of the cooling air within the duct 32 is produced by a fan 20.

The operation will next be explained together with the detail of the structure.

The absorbing solution in the first generator 2 is heated by the burner 9 and generates refrigerant vapor and the solution is concentrated. The refrigerant vapor produced by the first generator 2 flows into the heating pipe 14 in the second generator 3 through the refrigerant conduit 13.

The absorbing solution in the second generator 3 is heated by the refrigerant vapor in the heating pipe 14 and generates refrigerant vapor. At this stage the refrigerant vapor in the heating pipe 14 is liquefied and the absorbing solution in the second generator 3 is concentrated.

The refrigerant vapor generated by the second generator 3 enters the condenser 4 from the refrigerant conduit 15. The liquefied refrigerant joins the refrigerant of a refrigerant conduit 17 through a refrigerant conduit 16.

The condenser 4 has fins 18 outside the pipe and a fan 19 causes the air outside the condenser to flow through the fins 18, whereby the refrigerant vapor in the condenser 4 is cooled and liquefied. This liquefied refrigerant passes through the refrigerant conduit 17, joins the liquefied refrigerant from the refrigerant conduit 16, further joins the liquefied refrigerant exhausted from the refrigerant pump 12, and flows into the evaporator 5 through a refrigerant conduit 21.

The liquefied refrigerant from the refrigerant conduit 21 is sprayed from the spray header 23 onto the cold water pipe 22 in the evaporator 5. Since the pressure within the evaporator 5 is maintained at a low pressure, the liquid refrigerant is evaporated and the latent heat at this time takes heat away from the water in the cold water pipe 22, cools the water and thereby produces cold water.

The liquid refrigerant left unevaporated is temporarily stored in a refrigerant sink 24 and returns to the refrigerant conduit 21 through a refrigerant conduit 25, the refrigerant pump 12 and a refrigerant conduit 26. The refrigerant vapor evaporated here rises through a refrigerant passage 48 and flows into the absorber 6.

Dense solution passing from the dense solution pump 11 through a dense solution conduit 31 is sprayed from a spray header 30 provided at the upper portion of the absorbing pipe 28 of the absorber 6. The sprayed dense solution is cooled by the air outside the absorber flowing outside the pipe while it is flowing along the pipe wall of the absorbing pipe 28 in the downward direction, and the vapor pressure within the absorbing pipe 28 is lowered, whereby the dense solution absorbs refrigerant vapor from the evaporator and is diluted.

The duct 32 provided around the absorber 6 is an absorbing duct which encloses the absorber 6 and has a fan 20.

An air duct 34 is formed between the absorbing pipes 28 and the duct 32. An upward airflow is produced in the air duct 34 by the rotation of the fan 20. This airflow cools the fins 29 and the absorbing pipe 28 of the absorber 6. The air which flows through the air duct 34 is fed from outside the absorber through an intake port 33.

Figure 4:
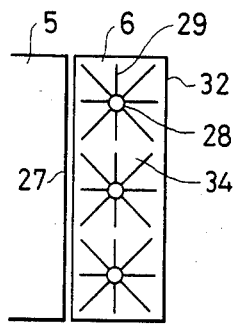
FIG. 4 is a sectional view of the air cooling type absorption cooler shown in FIG. 1 taken along the line A—A.

As is shown in FIG. 4, the plurality of fins 29 are radially provided outside the absorbing pipe 28. These fins 29 extend in parallel to the axis of the absorbing pipe 28, or may be inclined relative to the axis. The duct 32 which is slightly apart from the ends of the fins 29 encloses all the absorbing pipes 28. The cooling air which flows through the air duct 34 surrounded by the absorbing pipes and the fins 29 in the opposite direction to the solution and the refrigerant vapor whereby the refrigerant vapor and solution are cooled by the air.

Since the air duct 34 is surrounded in this way, the state in which the cooling air comes into contact with the absorbing pipes 28 and the fins 29 is improved and the thermal efficiency of the absorber 6 is heightened.

The above-described situation wherein the directions of the airflow of the cooling air and of the absorbing solution and the refrigerant vapor are opposite in the absorber 6 whereby the thermal efficiency of the absorber 6 is heightened makes possible the realization of an air cooling type absorption chiller.

A slit 35 is formed in order to improve the heat transfer of the fins 29. Into the absorbing pipe 29 a spiral board or a pad (not shown) is inserted in order to improve the contact of the dense solution with the pipe wall and the contact of the dense solution with the refrigerant. Further a fin or a groove (not shown) is provided on the inner surface of the absorbing pipe 28 in order to heighten the heat transfer within the pipe.

The dilute solution delivered from the absorber 6 enters a second absorber 62. The second absorber 62 consisting of a heat transfer pipe 63 and fins 64 is provided in the refrigerant passage 48 of the evaporator 5.

In the second absorber 62 heat is exchanged between, on the one hand, either the dilute solution or the dilute solution which flows together with a part of the refrigerant vapor in the heat transfer pipe 63, and the refrigerant vapor which rises in the refrigerant passage 48, and the dilute solution is thus further cooled, whereby the absorbent concentration of the absorbing solution becomes lower and the absorbing operation is accelerated. The absorbent concentration of the dilute solution produced here is sufficiently weak for realization of a cooler with an air cooling type absorber.

The dilute solution sucked by the dilute solution pump 10 is supplied to and pre-heated by the second heat exchanger 8 through a dilute solution conduit 36, and is separated into two flow components; one is delivered to the second generator 3 through a dilute solution conduit 38 and the other is pre-heated by the first heat exchanger 7 and flows from a dilute solution conduit 39 into the first generator 2.

On the other hand, the dense solution of the first generator 2 flows from a dense solution conduit 40 into the first heat exchanger 7, where it itself is cooled while heating the dilute solution. Thereafter it enters the second heat exchanger 8, and joins the dense solution there which flows from the second generator 3 into the second heat exchanger 8 through a dense solution conduit 42, thereby further heating the dilute solution in the second heat exchanger 8 and being sprayed by the dense solution pump 11 into the absorber 6 through the dense solution conduit 31.

Embodiment 2

Figure 2:
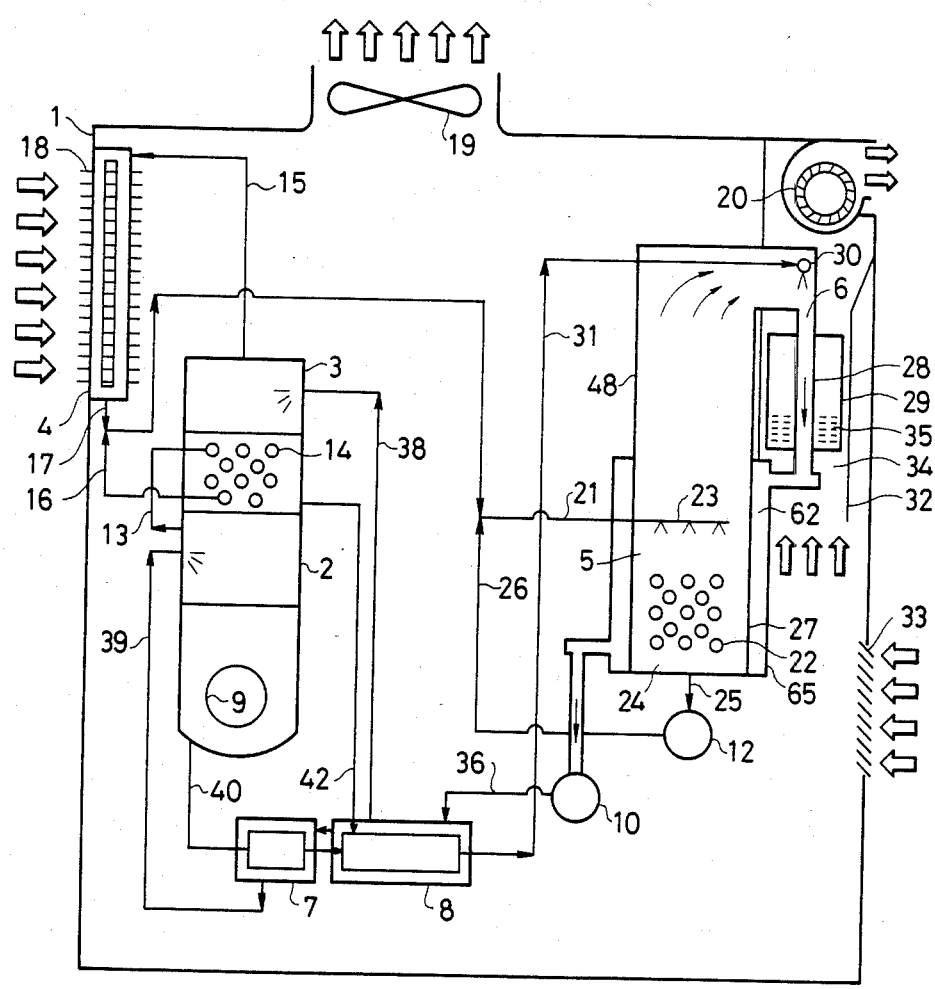
FIG. 2 is a flow diagram of a second embodiment of an air cooling type absorption cooler according to the invention.

FIG. 2 shows a second embodiment of the invention. Only those features which are different from the first embodiment shown in FIG. 2 will be explained.

The second absorber 62 is composed of an evaporator shell 27 and a jacket 65 provided around the evaporator shell 27. In the second absorber 62, heat is exchanged between, on the other hand, the dilute solution alone in the jacket 65 or the dilute solution with a part of the refrigerant vapor which is flowing in the jacket 65 and the refrigerant vapor in the evaporator 5 and the refrigerant passage 48. Thus the dilute absorbing solution is further cooled into an absorbing solution with a weaker absorbent concentration and is sucked by the dilute solution pump 10.

Embodiment 3

Figure 3:
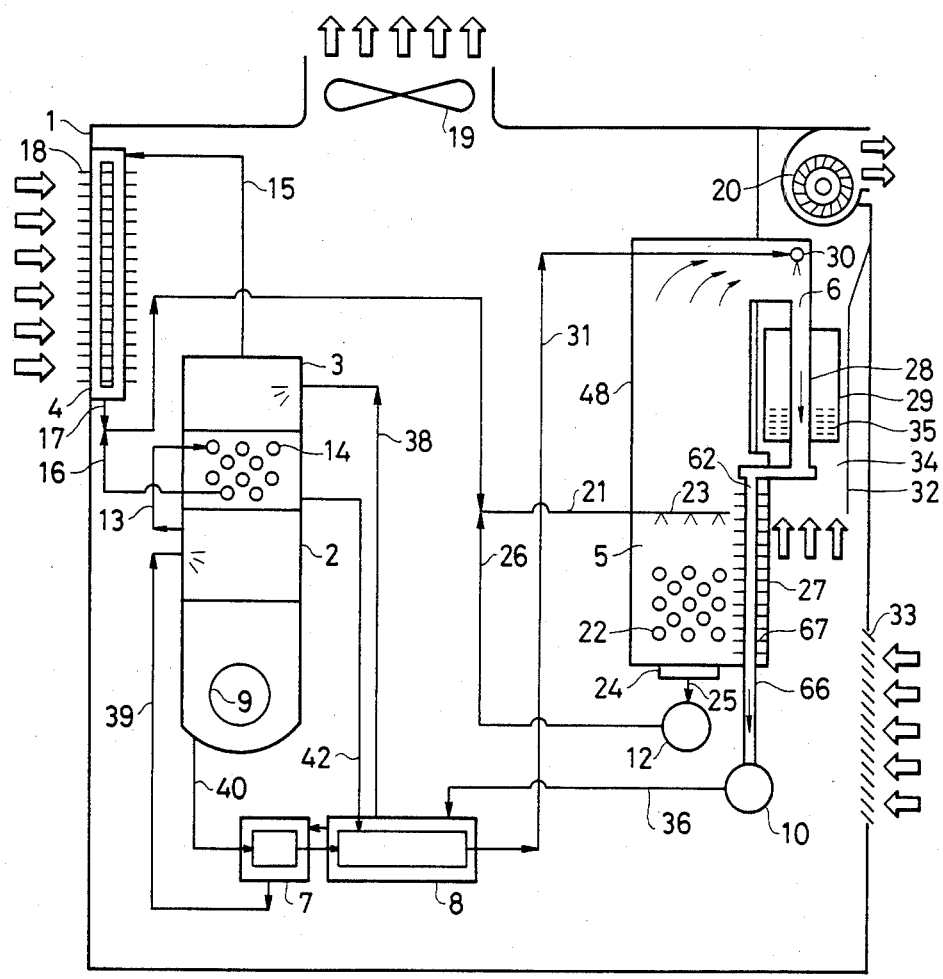
FIG. 3 is a flow diagram of a third embodiment of an air cooling type absorption cooler according to the invention.

FIG. 3 shows a third embodiment of the invention. Those features which are different from the embodiment shown in FIGS. 1 and 2, respectively, will be explained.

The second absorber 62 which is composed of a transferring pipe 66 and fins 67 is disposed in the evaporator 5. In the second absorber 62, heat is exchanged between, on the one hand, either the dilute solution alone or the dilute solution with a part of the refrigerant vapor which is flowing in the transferring pipe 66 and the refrigerant vapor in the evaporator 5, and the dilute solution is further cooled into a solution with a weaker absorbent concentration and is sucked by the dilute solution pump 10.

Embodiment 4

Figure 5:
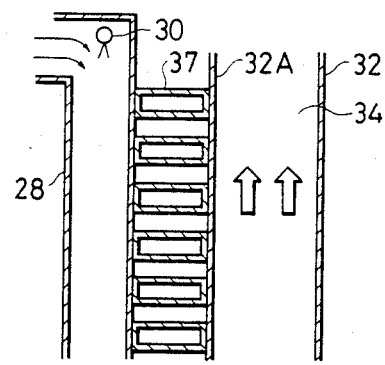
FIG. 5 is an explanatory view of the vicinity of a heat transferring means in a fourth embodiment of the invention.

FIG. 5 shows a fourth embodiment of the invention. Only those features which are different from the above-described embodiments will be explained.

The air duct 34 is provided at a position apart from the absorbing pipes 28. The wall 32A of the duct 32 constituting the air duct 34 and the absorbing pipes 28 are connected by a heat transferring means consisting of a plurality of heat pipes 37. A heat transfer medium such as florocarbon is charged into the heat pipe 37.

The gaseous heat transfer medium in the heat pipe 37 is cooled by air through the wall 32A and forms a liquefied heat transfer medium, which flows toward the side of the absorbing pipe 28.

This liquid heat transfer medium cools the absorbing solution and the refrigerant vapor in the absorbing pipes 28 through the pipe walls of the absorbing pipes 28 and evaporates. The evaporated gaseous heat transfer medium flows toward the wall 32A and is cooled again by air into liquid form. As described above, the absorbing solution and the refrigerant vapor in the absorbing pipes 28 are cooled by the air which flows upward in the air duct 34 through the heat pipes 37.

Embodiment 5

Figure 6:
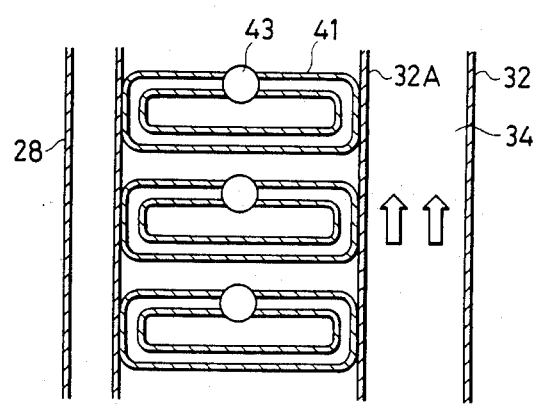
FIG. 6 is an explanatory view of the vicinity of a heat transferring means in a fifth embodiment of the invention.

FIG. 6 shows a fifth embodiment of the invention; only those features which are different from the above-described embodiments are explained in the following.

In this embodiment, each absorbing pipe 28 is connected with the air duct 34 by the heat transferring means. The heat transferring means consists of a heat transfer medium circuit 41 and a pump means 43 for circulating the heat transfer medium therein, and carries the heat of each absorbing pipe 28 to the air duct 34 by the heat transfer medium so as to remove the heat by the effect produced by the upwardly moving air which passes through the air duct 34. The cooled air transfer medium flows toward each absorbing pipe 28, and again absorbs heat it, thereby cooling the absorbing solution and the refrigerant vapor flowing downwardly through the absorbing pipe 28.

Embodiment 6

Figure 7:
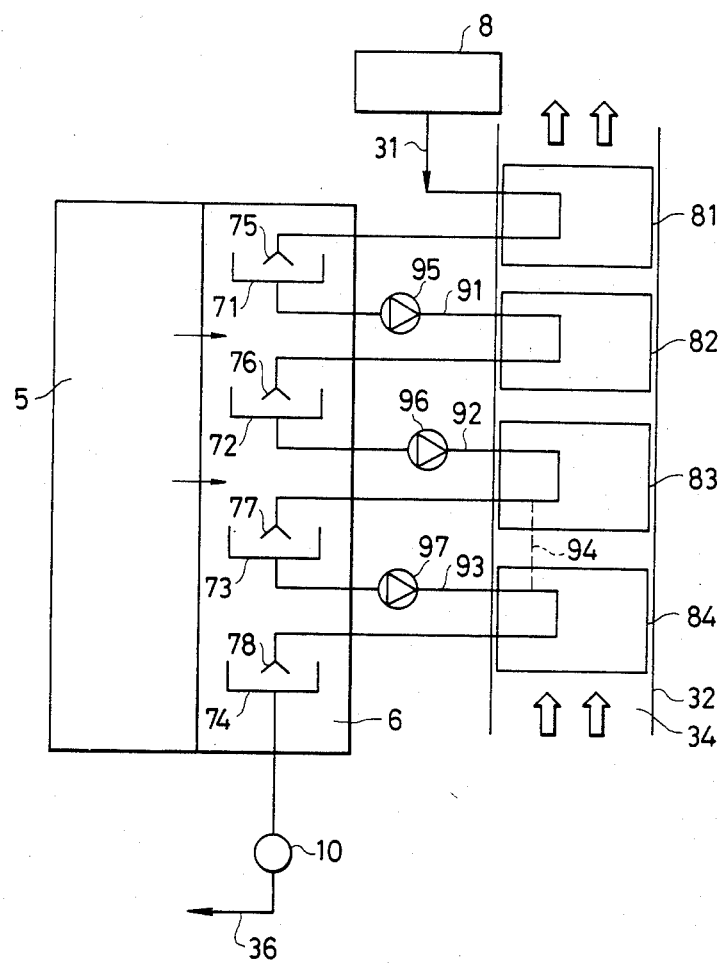
FIG. 7 is an explanatory view of the main part of a sixth embodiment of the invention.

FIG. 7 shows a sixth embodiment of the invention. Only those features which are different from the above-described embodiments will be explained.

The absorber 6 is disposed beside the evaporator 5 and a plurality of drip pans 71, 72, 73, and 74 are arranged in the vertical direction together with the same number of spray headers 75, 76, 77, and 78.

The spray header 75 at the top stage is connected to the dense solution conduit 31 through fins 81 which are disposed in the air duct 34. The drip pan 71 at the top stage is connected to the spray header 76 at the second stage through a conduit 91.

A pump means 95 and fins 82 are provided midway in the conduit 91. The next stage has a similar structure. In order to mix a part of the absorbing solution which is sprayed into the drip pan 74 at the bottom stage with the absorbing solution which is sprayed from the spray header 77 at the previous stage into the drip pan 73, conduits 92 and 93 are connected by a conduit 94.

The dense solution from the second heat exchanger 8 passes through the dense solution conduit 31, and is sprayed from the uppermost spray header 75 into the uppermost drip pan 71. This dense solution is cooled by the air which flows upwardly in the air duct 34 through the fins 81 before being sprayed from the uppermost spray header 75. For this reason, though the absorbing solution which is sprayed from the uppermost spray header 75 cannot absorb the refrigerant vapor, slight additional cooling enables absorption of the refrigerant vapor.

The absorbing solution in the uppermost drip pan 71 passes through the conduit 91 and is sprayed from the second spray header 76 into the second drip pan 72 by the pump means 95. Since this absorbing solution has been cooled by the air which flows upwardly in the air duct 34 through the fins 82 before being sprayed from the second spray header 76, it absorbs the surrounding refrigerant vapor when sprayed from the spray header 76, whereby the amount of refrigerant contained in the absorbing solution increases.

A similar operation is repeated at the third and later stages, and at the last stage dilute absorbing solution containing much refrigerant is generated, which is delivered by the dilute solution pump 10 from the dilute solution conduit 36 to the first and second generators 2 and 3.

Embodiment 7

Figure 8:
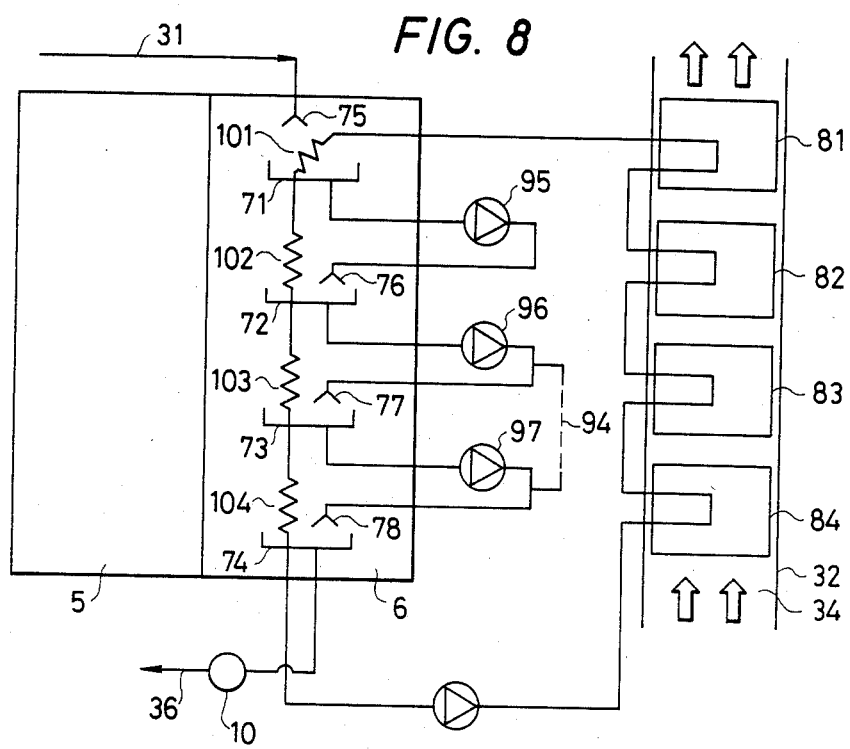
FIG. 8 is an explanatory view of the main part of a seventh embodiment of the invention.

FIG. 8 shows a seventh embodiment of the invention. This embodiment is a variation of the sixth embodiment.

Coils 101, 102, 103 and 104 for cooling the sprayed absorbing solution are provided on the relevant drip pans 71, 72, 73 and 74, and the heat transfer medium which has passed each of the coils 101, 102, 103 and 104 is cause to flow through the fins 81, 82, 83 and 84 in that order. The absorbing solution from each of the drip pans 71, 72, 73 and 74 is fed to the relevant spray header 76, 77, 78 at the next stage by the relevant pump means 95, 96 and 97.

Embodiment 8

Figure 9:
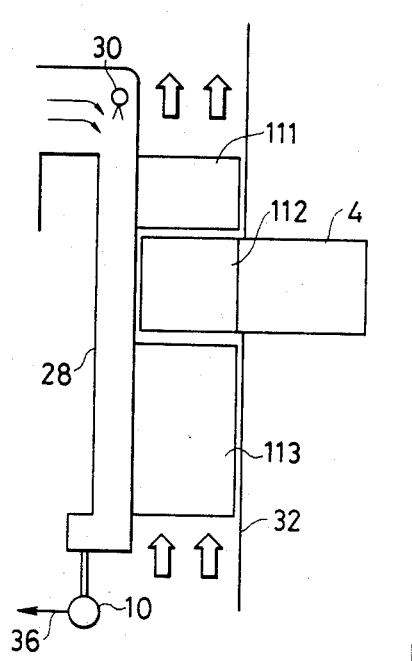
FIG. 9 is an explanatory view of the main part of an eighth embodiment of the invention.

FIG. 9 shows an eighth embodiment of the invention. The fins in the air duct 34 are divided into at least three portions 111, 112 and 113.

The fins 113 situated on the extreme upstream side of the cooling air cool the absorbing solution and the refrigerant vapor, both of which are at the absorbing operation stage of the absorber 6. The fins 111 on the extreme downstream side cool the absorbing solution and the refrigerant vapor, both of which are at the cooling operation stage of the absorber 6. The intermediate fins 112 cool the condenser 4.

The cooling operation stage of the absorber 6 here means the state of the absorber 6 in which the absorber 6 cannot absorb the refrigerant vapor but wherein slight additional cooling enables absorption of the refrigerant vapor, and the absorbing operation stage means the state of the absorber 6 in which the absorbing solution is absorbing the refrigerant vapor.

What is claimed is:

1. An air cooling type absorbing cooler comprising:
   a first generator with a heating source into which is poured absorbing solution composed by mixing lithium bromide as an absorbent with water as a refrigerant;
   a second generator into which said absorbing solution is poured and in which the refrigerant vapor generated by said first generator is used as a heating source;
   a condenser for cooling with air the refrigerant generated by said first and second generators;
   an evaporator for producing a chilled water by evaporating the refrigerant from said condenser;
   an air cooling type absorber which uses air as a cooling source for producing dilute absorbing solution containing more refrigerant by making the absorbing solution which is returned from said first and secohd generators absorb the refrigerant vapor from said evaporator;

a solution pump for supplying said dilute absorbing solution generated by said air cooling type absorber to said first and second generators; and a heat exchanger for exchanging heat between said dilute absorbing solution supplied from said absorber to said first and second generators and the absorbing solution which is returned from said first and second generators to said absorber;

said air cooling type absorber including an absorbing pipe for the passage of said absorbing solution and refrigerant vapor and a passage provided outside of said absorber through which the air which is to cool said absorbing solution and said refrigerant vapor may pass and so constituted as to exchange heat between said cooling air at the inlet side and said absorbing solution and refrigerant vapor at the outlet side, and between said cooling air at the outlet side and said absorbing solution and refrigerant vapor at the inlet side.

2. An air cooling type absorbing cooler according to claim 1, wherein said absorber has a plurality of absorbing pipes which extend approximately in the vertical direction, and fins which are attached to said absorbing pipes; and said passage for said cooling air is composed of a duct which has a fan for producing airflow therewithin and which is disposed around said fins, whereby said absorbing solution and refrigerant vapor flow downward in said absorbing pipes and said cooling air flows upward in said duct.

3. An air cooling type absorbing cooler according to claim 2, wherein each of said fins are radially attached to each of said absorbing pipes.

4. An air cooling type absorbing cooler according to claim 1, wherein said passage for passing said absorbing solution and refrigerant vapor therein and said passage for passing said cooling air therethrough are provided apart from each other and the wall of both of said passages are connected by a heat transferring means.

5. An air cooling type absorbing cooler according to claim 4, wherein said heat transferring means is a plurality of heat pipes into which a heat transfer medium is charged and which connects said walls of said passages.

6. An air cooling type absorbing cooler according to claim 4, wherein said heat transferring means with a heat transfer medium charged thereinto connects said walls of said passages; and said heat transfer medium is so constituted as to be circulated by a pump means disposed between said walls of said passages.

7. An air cooling type absorbing cooler according to claim 1, wherein said absorber includes a plurality of drip pans, spray headers to the same number as said drip pans, conduits for connecting each of said drip pans to the corresponding spray header at the following stage, and pump means arranged midway of each of said conduits; each of said conduits passing through fins disposed in said passage for said cooling air, whereby said absorbing solution which flows through each of said conduits is cooled by said cooling air.

8. An air cooling type absorbing cooler according to claim 1, wherein said absorber includes therewithin a plurality of drip pans, spray headers of the same number as said drip pans, conduits for connecting each of said drip pans to the corresponding spray header at the following stage, and pump means arranged midway of each of said conduits, cooling coils which are disposed between each of said spray headers and said drip pans each of said coils being connected in series; and wherein the heat transfer medium which circulates within said cooling coils is cooled by said cooling air.

9. An air cooling type absorbing cooler according to claim 1, wherein fins are provided in said passage through which said cooling air passes; said fins are divided into at least three portions in the direction in which said cooling air flows, wherein the extreme downstream portion cools said absorbing solution and refrigerant vapor in said absorber such that said absorbing solution can absorb said refrigerant vapor when slight cooling is effected thereto, the extreme upstream portion cools said absorbing solution and refrigerant vapor in said absorber in the state where said absorbing solution can absorb said refrigerant vapor or absorption is in progress, and the intermediate portion cools said refrigerant vapor in said condenser.

10. An air cooling type absorbing cooler according to claim 7, wherein said fins are divided into the same number of portions as the number of said drip pans in the direction in which cooling air flows.

11. An air cooling type absorbing cooler comprising:

a first generator with a heating source into which is poured an absorbing solution composed by mixing lithium bromide as an absorbent with water as a refrigerant;

a second generator into which said absorbing solution is poured and in which the refrigerant vapor generated by said first generator is used as a heating source;

a condenser for cooling with air the refrigerant generated by said first and second generators;

an evaporator for producing a chilled water by evaporating the refrigerant from said condenser;

an air cooling type absorber which uses air as a cooling source for generating dilute absorbing solution containing more refrigerant by making the absorbing solution which is returned from said first and second generators absorb the refrigerant vapor from said evaporator;

a second absorber for further cooling the dilute absorbing solution produced by said air cooling type absorber by exchanging heat between said dilute absorbing solution and the refrigerant vapor in said evaporator;

a solution pump for supplying said dilute absorbing solution from said second absorber; and a heat exchanger for exchanging heat between said dilute absorbing solution supplied from said absorber to said first and second generators and the absorbing solution which is returned from said first and second generators to said absorber;

said air cooling type absorber including an absorbing pipe which extends approximately in the vertical direction for passing said absorbing solution and refrigerant vapor therein, fins attached around said absorbing pipe, and a fan provided around said fins for producing upward airflow of said cooling air.

12. An air cooling type absorbing cooler according to claim 11, wherein said second absorber is connected to said absorbing pipe of said air cooling type absorber, and includes a heat transferring pipe which passes through said evaporator and fins which are attached around said heat transferring pipe such that said dilute absorbing solution in said heat transferring pipe is cooled by said refrigerant vapor in said evaporator.

13. An air cooling type absorbing cooler according to claim 11, wherein said second absorber is provided around said evaporator.

14. An air cooling type absorbing cooler according to claim 12, wherein said heat transferring pipe is disposed such as to remain in contact with both the refrigerant vapor and refrigerant liquid in said evaporator.

* * * * *